UNITED STATES PATENT OFFICE.

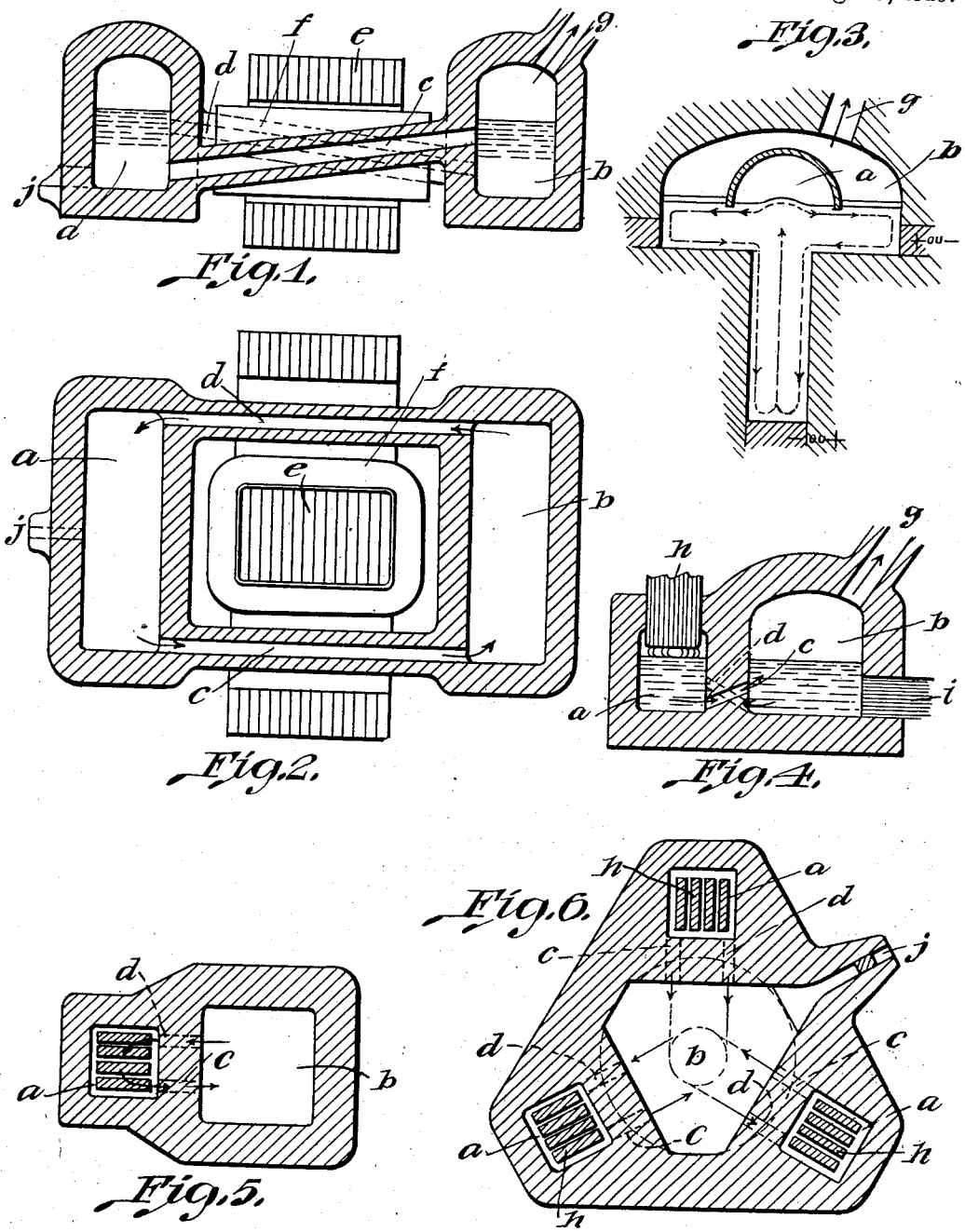

DIOGO DIAS DE BARROS, OF SÃO PAULO, BRAZIL.

MEANS FOR REDUCING ORES.

1,313,274.   Specification of Letters Patent.   Patented Aug. 19, 1919.

Application filed December 27, 1917. Serial No. 209,080.

*To all whom it may concern:*

Be it known that I, DIOGO DIAS DE BARROS, residing at São Paulo, 15 Rua Ypiranga, 3 er Andar B, in the Republic of Brazil, have invented certain new and useful Improvements in Means for Reducing Ores; and I do hereby declare the following to be a full, clear, and exact description of the invention, such as will enable others skilled in the art to which it appertains to make and use the same.

My invention relates to improved means for reducing ores of all sorts which are soluble in their metal or its alloys, and its object is to reduce the ore with a minimum amount of carbon. The invention consists in conveying the carbon previously dissolved in the metal or its alloys in one first zone of the furnace unto the ore dissolved in the metal or its alloys in a second zone distinct from the former, whereas the gases of the reduction are disengaged in an oxidizing medium which is favorable to the production of $CO_2$.

The furnace is heated by an external agent which is normally electricity, the current being either generated direct or induced. According to the invention, carbon either pure or mixed with reagents, is led into the first zone of the furnace and is dissolved in the molten metal, whereas the ore, either alone or mixed with reagents, is led into the second zone and likewise dissolved in the metal. The carbureted metal of the first zone is led by any suitable means, continuously or otherwise, unto the dissolved ore of the second zone, *i. e.* the carbon does not enter the reduction crucible mingled with the ore as it does in a blast furnace but the reduction takes place between the dissolved carbon and oxid. The gases of the reduction are disengaged in the oxidizing medium into which the ore falls and give out $CO_2$ instead of CO, which corresponds to the employment of a minimum of carbon. The amounts of carbon and oxid introduced into the furnace are in a predetermined ratio proportional with the power of the furnace.

In the preferred form of the invention, the introduction of the carbureted metal into the reduction zone is effected by a continuous circulation, the metal wholly or partly deprived of oxid and carbon being extracted by means of periodical tappings.

The accompanying drawings show, by way of example, several embodiments of the invention comprising different furnaces with continuous circulation.

Figure 1 shows diagramamtically an elevation and Fig. 2 a plan view of an induction furnace with separate carbureting and oxidizing crucibles.

Fig. 3 illustrates a T-shaped direct current furnace arranged to separate the two zones of treatment.

Fig. 4 is an elevation and Fig. 5 a plan view of a furnace with combined heating by arc and resistance.

Fig. 6 is a plan view of a three-phase furnace also with combined heating by arcs and resistances.

In the arrangement of Figs. 1 and 2, a carbureting crucible $a$ is connected with the reducing crucible $b$ by means of an ascending tube $c$ leading from the former to the latter, and an ascending tube $d$ in the opposite direction. The circuit formed by the crucibles and the two tubes is closed about an induction core $e$ whose primary winding designated by $f$ can be arranged around the core according to the construction best adapted to the furnace. The heating due to the secondary current closed through the bulk of metal and ore is particularly intense in tubes $c$ and $d$, which tends to cause the liquid to ascend. Circulation thus arises between the two crucibles thereby producing the operations mentioned above.

Fig. 3 shows another type of direct current furnace in which the electric force lines are attracted toward the central part of the furnace so as to heat the metal in said part. The metal rises to the surface and flows continually in the direction shown by the arrows. The carbureting zone $a$ is provided at the center of the furnace and the reduction zone $b$ at the periphery, the gases being evacuated at $g$.

In the single-phase furnace of Figs. 4 and 5, $a$ is the carbureting crucible, $b$ the oxidizing crucible wherein the ore falls, $c$ and $d$ the inclined tubes which cause the heating and the circulation of the bulk. Heating is accelerated in crucible $a$ by the arc breaking between the coal electrode $h$ and the bath. The current closes through the second electrode $i$ which is immersed. This type of furnace may have certain inconveniences in practice owing to the necessity of having an immersed electrode. It has been described more particularly to explain the three-phase furnace which follows.

The latter which is illustrated in Fig. 6 comprises three carbureting crucibles $a$ and one central oxidizing crucible $b$ for the reactions between the gases and the ore. The circulation between the crucibles is obtained in the direction of the arrows by the inclined tubes $c$ and $d$, that complete the heating of the bulk which is already secured by the arcs beneath the electrodes $h$. The furnace is star-connected, crucible $b$ forming the neutral point. In the vault of crucible $b$ is provided the escape of the gases and on the side the tapping hole $j$.

In the above described furnaces the usual thermal and electric measuring apparatus allow the reactions to be supervised. It will be observed that the simultaneous measurements of the temperature of the bath, the difference of potential between the carbureting and oxidizing crucibles, and the intensity of current enable the composition of the bath to be determined very exactly and consequently the percentage of carbon. The furnace can produce, starting from the iron ore itself, either cast iron or steel.

The invention is applicable more particularly to rich and pure ores such as found in countries deprived of coal. With choice ores it will be sufficient to employ a comparatively small quantity of coke of good quality to obtain valuable products. In the case of less rich and pure ores, the impurities of the ore and coal which are introduced into the bath should be separated by means of appropriate reagents.

It will be further remarked that the invention applied to rich iron ores permits of obtaining, by a suitable dosage of the carbon and ore, either cast iron or steel directly.

Whereas I have described the most suitable embodiments of my invention, it will be understood that the different types of furnaces and their arrangement, may vary considerably and be adapted in particular to the electric current employed and the sort of ore to be treated.

What I claim is:

1. The process of treating ore which consists in fusing the metal obtained from the ore in two zones, dissolving carbon in one zone and ore in the other zone, and conveying the dissolved carbon from the first named zone to the other.

2. The process of treating ore which consists in fusing the metal obtained from the ore in two zones, dissolving carbon in one zone and ore in the other zone, and setting up a circulation of molten material from the first-named zone to the other and back again, whereby a continuous process is obtained.

In testimony whereof I affix my signature in presence of two witnesses.

DIOGO DIAS DE BARROS.

Witnesses:
EDUARDO DE AGUIAR D'ANDRADE,
FRANCISCO D'ARRUDA BEIRO.